(12) United States Patent  (10) Patent No.: US 8,616,124 B2
Humbert                    (45) Date of Patent:    Dec. 31, 2013

(54) PRESSURE RELIEF VALVE FOR A ROUND BALER

(75) Inventor: Clement Humbert, Quingey (FR)

(73) Assignee: Deere & Company, Moline, IL (US)

( * ) Notice: Subject to any disclaimer, the term of this patent is extended or adjusted under 35 U.S.C. 154(b) by 130 days.

(21) Appl. No.: 13/043,121

(22) Filed: Mar. 8, 2011

(65) Prior Publication Data

US 2012/0055354 A1    Mar. 8, 2012

(30) Foreign Application Priority Data

Mar. 10, 2010  (DE) .......................... 10 2010 002 733

(51) Int. Cl.
*B30B 9/00*        (2006.01)
(52) U.S. Cl.
USPC ............................ 100/76; 100/87; 251/129.01
(58) Field of Classification Search
USPC ......... 100/76, 86, 87, 88, 89, 43; 251/129.18, 251/327, 129.15, 291, 291.031, 129.01; 56/341
See application file for complete search history.

(56) References Cited

U.S. PATENT DOCUMENTS

| 4,611,535 A * | 9/1986 | Anstey et al. ................... 100/43 |
| 5,113,896 A * | 5/1992 | Tortellier ...................... 137/269 |
| 2011/0139260 A1* | 6/2011 | Dornbach et al. .............. 137/12 |

FOREIGN PATENT DOCUMENTS

| DE | 19718229 A1 | 11/1998 |
| EP | 1059476 A2  | 12/2000 |

* cited by examiner

*Primary Examiner* — Dana Ross
*Assistant Examiner* — Mohammad Nourbakhsh

(57) ABSTRACT

A pressure-relief valve is provided. The pressure-relief valve having a valve body with a passage that can be closed by a moving closure element. An electromagnet is mounted detachably on the valve body and interacts with an armature in driving connection with the closure element. A spring interacts with the closure element the bias tension of which can be changed by an adjustment element that can be moved manually relative to the valve body. The adjustment element and the valve body are constructed such that a manual change of the bias tension of the spring by means of the adjustment element is then possible only when the electromagnet is detached from the valve body. Also provided is a round baler employing such a pressure-relief valve.

12 Claims, 2 Drawing Sheets

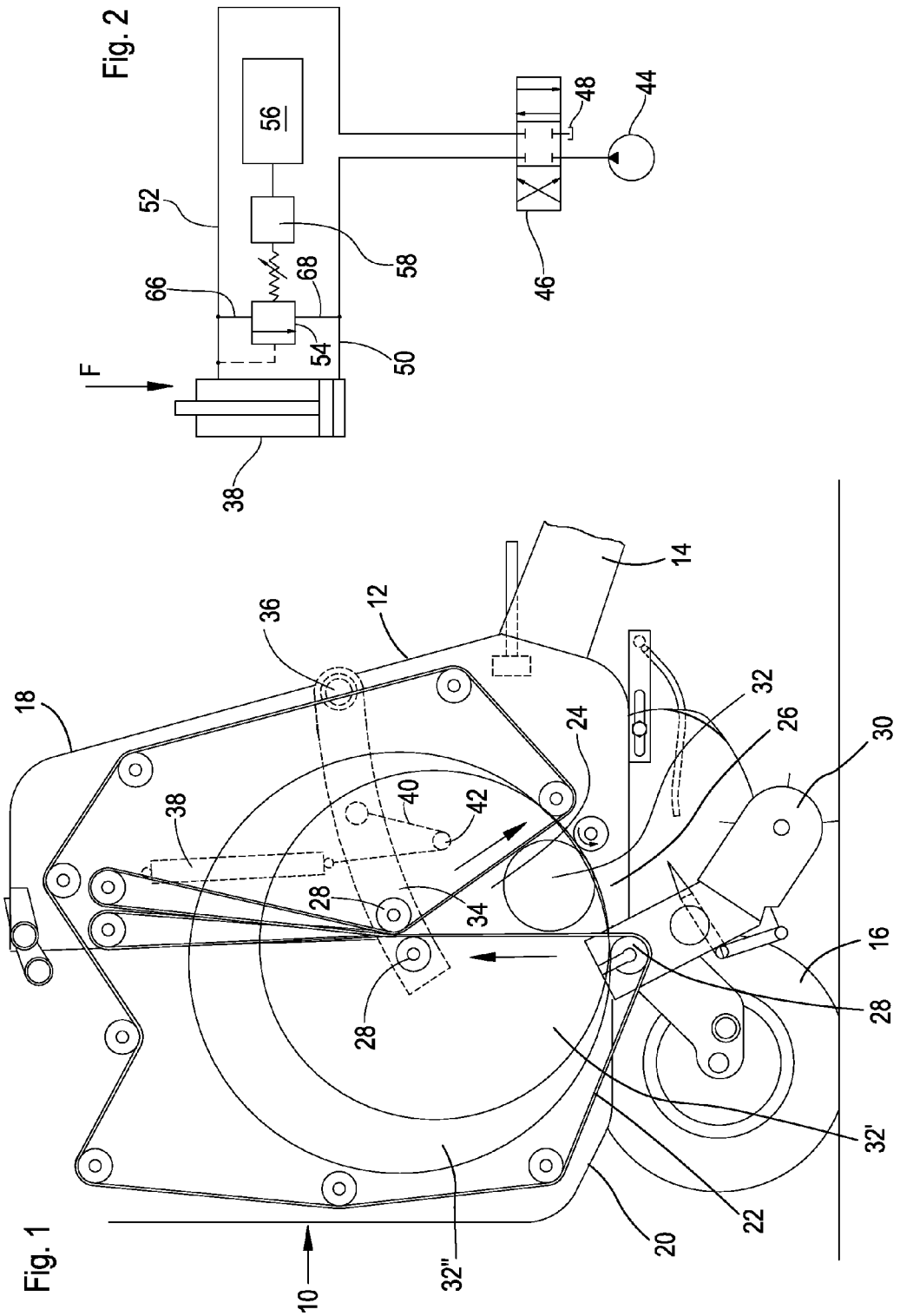

PRESSURE RELIEF VALVE FOR A ROUND BALER

FIELD OF THE INVENTION

The invention herein relates to a pressure-relief valve having a valve body with a passage that can be closed by a moving closure element. An electromagnet interacts with a moving armature in driving connection with the closure element. A spring interacts with the closure element, a biasing tension of the spring being changeable by an adjustment element that can be moved manually relative to the valve body. The invention further relates to a round baler equipped with such a pressure-relief valve.

BACKGROUND OF THE INVENTION

In round balers of variable bale chamber design, the tension of the bale forming elements (e.g. belts) is typically defined by a hydraulic cylinder that interacts with a moving tension arm that carries a deflection roller abut which, in turn, the bale forming elements revolve (normally one or more belts or bar-chain conveyors). The pressure in the hydraulic cylinder is normally controlled by way of a pressure-relief valve whose opening pressure can be controlled electromagnetically. According to U.S. Pat. No. 4,611,535 a driving of the pressure-relief valve is provided in the sense of a reduction in the pressure in the hydraulic cylinder and thus the tension of the bale forming elements, when an excess torque is detected on the main drive shaft. In German Patent document DE 197 18 229 A1 it is proposed to drive the pressure-relief valve as a function of a desired bale density and bale size, while, in the non-energized state, the pressure-relief valve in European Patent Application EP 1 059 476 A2 is held in the closed state by a biased spring.

In the baler according to U.S. Pat. No. 4,611,635, the opening pressure of the pressure-relief valve can be adjusted by hand by means of plain washers that can be inserted between a spring and the armature of the electromagnet. In EP 1 059 476 A2, the opening pressure of the pressure-relief valve can be adjusted by hand by means of an adjustment screw changing the bias tension of a compression spring. This manual adjustability of the opening pressure of the pressure-relief valve is useful especially when the electronic controller of the pressure-relief valve is interfered with or has failed.

In both of the above-mentioned balers, a failure or interference in the electronic controller of the pressure-relief valve results in a relatively high opening pressure. Now, if the operator inadvertently sets the opening pressure of the pressure-relief valve even higher, then it is possible that a structurally specified maximum pressure in the hydraulic cylinder is exceeded, which could result in damage to the baler. This problem occurs to an elevated degree if the electromagnet (like in the embodiment according to FIG. 3 of U.S. Pat. No. 4,611,535) in the energized state increases the opening, and the error in the electronics leads to a permanent excitation of the electromagnet.

SUMMARY OF THE INVENTION

The problem forming the basis of the invention is thus seen in the need for a pressure-relief valve being provided with an opening pressure that can be changed electromagnetically and manually, and in which it is not possible that maximum permissible pressure cannot be exceeded.

Accordingly, a pressure-relief valve, as disclosed herein, comprises a valve body with a passage provided therein that can be closed by a moving closure element. The closure element interacts with a moving armature of an electromagnet and a spring. To be able to change the opening pressure of the pressure-relief valve by hand when an error occurs in the electronic controller of the electromagnet or in the electromagnet itself, the valve body and an adjustment element that can be moved manually are constructed such that a manual adjustment of the bias tension of the spring is possible by means of the adjustment element only when the electromagnet is detached from the valve body.

In this way, situations are prohibited in which the electromagnet and the spring set by hand, together increase the opening pressure of the pressure-relief valve to a value at which there is the risk of damage to the hydraulic system or to a round baler equipped with the pressure-relief valve.

In one preferred embodiment, the electromagnet or its housing forms a stop for the adjustment element. If the electromagnet is then mounted on the valve body, the adjustment element cannot be moved farther than specified by the stop and thus the bias tension of the spring does not increase.

The adjustment element can be equipped, in particular, with a thread that interacts with a thread of the valve body. Here, it is arbitrary whether the valve body has an internal or external thread; the adjustment element then has an external or internal thread.

The adjustment element can interact with the spring directly or via an intermediate element supported displaceably on the valve body.

The maximum bias tension that can be set with the adjustment element (which can be reached when the electromagnet is removed from the valve body) can be advantageously specified on the production side, in order to realize that a desired maximum opening pressure be reached but not exceeded. An adjustment screw, in particular, can be used for this purpose, wherein this adjustment screw is screwed into a body of the adjustment element. While the body can be moved relative to the valve body, the adjustment screw displaces one end of the spring relative to the body and consequently also relative to the valve body. In order to make later manipulations more difficult, the adjustment screw could be fixed permanently on the body of the adjustment element after its production-side adjustment, e.g., by adhesive or a coating, and/or be covered by a cover element.

The spring is preferably a compression spring that biases the closure element into a closure position blocking the passage.

When the electromagnet is energized it advantageously biases the closure element similarly into a closure position blocking the passage. In such a configuration, the construction according to the invention of the adjustment element and the valve body is especially useful, because, through the removal of the electromagnet, the increase of the opening pressure resulting from the electromagnet for a defective permanent excitation is avoided. The biasing of the spring corresponds to a minimum value when the electromagnet is fixed on the valve body. The minimum value advantageously corresponds to an opening pressure of 0 bar. The bias tension of the spring (and thus the opening pressure) can be increased by the adjustment element relative to the minimum value only when the electromagnet has been removed. In this way, the full displacement range of the pressure-relief valve is provided to the electromagnet.

The described pressure-relief valve can be used in an especially advantageous way on a round baler with a bale chamber bounded by one or more bale forming elements in which the tension of the one or more bale forming elements can be defined by means of a hydraulic cylinder whose pressure is determined by a pressure-relief valve according to the invention.

BRIEF DESCRIPTION OF THE DRAWINGS

In the description that follows the preferred embodiment(s) of the invention are described in detail with reference to the accompanying drawings wherein:

FIG. 1 is a round baler in partially schematic side view;

FIG. 2 is a hydraulic diagram of the hydraulic cylinder and the associated hydraulic system that define the tension of the bale forming elements of the round baler;

DESCRIPTION OF THE PREFERRED EMBODIMENT

Figure 4:
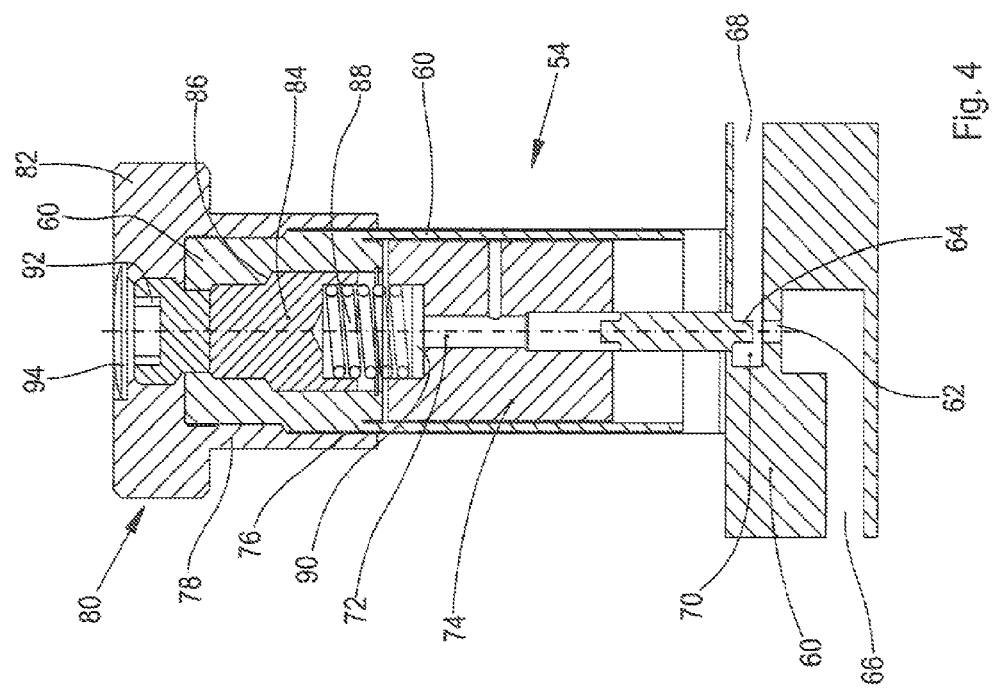

FIG. 1 shows a round baler 10 with a housing 12 that can be attached to a tractor (not shown) by means of a drawbar 14, in order to be pulled across a field in a driving direction toward the right with respect to FIG. 1, and is supported on wheels 16. The housing 12 is assembled from a front, rigid housing half 18 and a rear, pivoting housing half 20 that are pivotably connected to each other in a joint at the top. The housing 12 carries a plurality of rollers. Endless bale forming elements 22 that are arranged one next to the other run over the rollers. These bale forming elements mostly encompass, together with side walls of the housing 12, a bale chamber 24. In this embodiment, the bale forming elements 22 are constructed as belts. In the lower region of the bale chamber 24 there is an inlet 26 that is bounded at the back by a roller 28 and material taken up by a pick-up 30 can enter into the bale chamber 24.

The round baler 10 comprises several bale forming elements 22 arranged laterally one next to the other. They are set in motion during the harvesting operation and enclose a bale 32 forming in the bale chamber at the front, top, and back. The setup and the function of such a round baler are known. Refer to the disclosure of German Patent document DE 101 53 540 A, the contents of which are hereby incorporated herein by reference. The reference symbols 32, 32', and 32" designate bales of increasing diameter.

The tension of the bale forming elements 22 is determined by rollers 28 that are fixed on a tension arm 34. The tension arm 34 is hinged on the front housing half 18 about an axis 36 running horizontally and perpendicular to the forward direction and is coupled with a hydraulic cylinder 38 that is hinged on the front housing half 18 and whose piston rod is connected to the tension arm 34 by means of a flexible element 40, such as a cable or a chain. The flexible element 40 wraps around a deflection roller arranged underneath the tension arm 34 by nearly 180°. The greater the pressure in the piston rod space of the double-acting hydraulic cylinder 38, the more the tension arm 34 is biased downward and the greater the tension of the bale forming elements 22. Shown differently in the figures, tension arms 34 and hydraulic cylinder 38 are provided on both sides of the round baler 10.

FIG. 2 shows a hydraulic schematic of the hydraulic cylinder 38 and the hydraulic system used for its driving. The latter comprises a pump 44 for providing pressurized hydraulic fluid. The pump 44 could be located on board the round baler 10 or the tractor pulling the baler and is connected to a valve 46 with three positions and two paths and whose other inlet port is coupled with a storage container 48 for hydraulic fluid. With its one outlet, the valve 46 is connected through a line 50 to the piston chamber and, at its other outlet, through a different line 52 to the piston rod chamber of the hydraulic cylinder 38. With its inlet 66, a pressure-relief valve 54 is connected to the line 52 and the piston rod chamber of the hydraulic cylinder 38 and with its outlet 68 to the line 50 and the piston chamber. An electronic controller 56 is connected to an electromagnet 58 that can change the opening pressure of the pressure-relief valve 54. The force transmitted by the hydraulic cylinder 38 onto the tension arm 34 is designated with the letter F and depends on the pressure in the piston rod chamber.

It would also be conceivable to connect the piston rod of the hydraulic cylinder 38 directly to the tension arm. Then, in FIG. 2, the ports of the piston chamber and the piston rod chamber would be interchanged.

Figure 3:
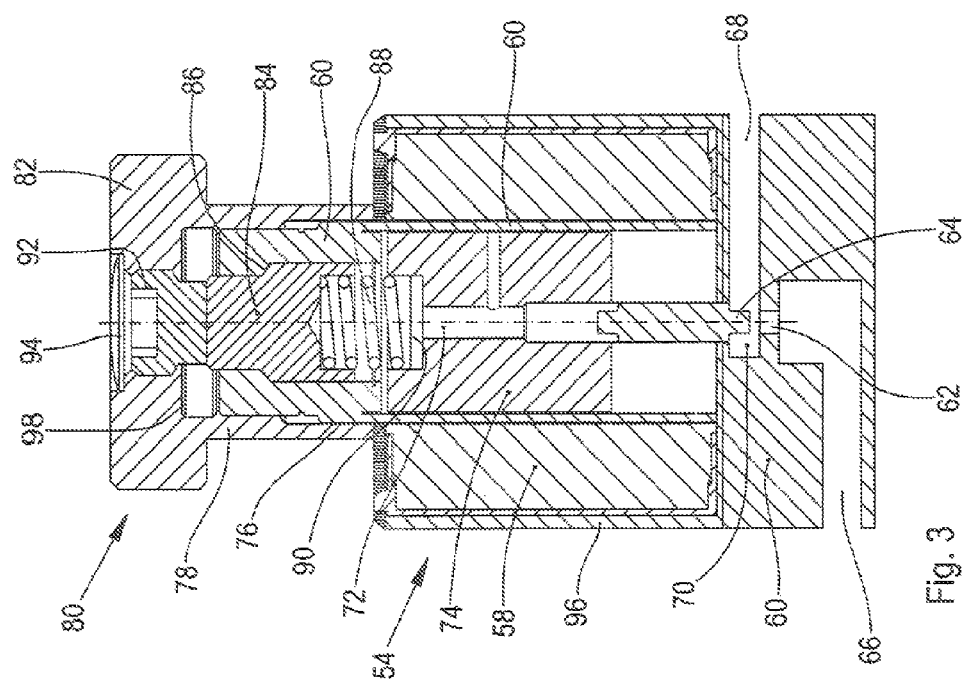
FIG. 3 is a sectional view of a pressure-relief valve with mounted electromagnet; and, FIG. 4 is a sectional view of the pressure-relief valve of FIG. 3 with detached electromagnet.

FIG. 3 shows a sectional diagram of the pressure-relief valve 54 with the electromagnet 58 fixed on this valve. The pressure-relief valve 54 comprises a valve body 60 that contains a passage 62. A closure element 64 that can move in the vertical direction in FIG. 3 relative to the valve body. 60 can be moved between a position closing the passage and an illustrated, opened position. The inlet 66 is connected to the bottom side of the passage 60 lying opposite the closure element 64, while the outlet 68 is connected to an annular space 70 surrounding the closure element 64. The closure element 64 is attached on the lower end of a tappet 72 on which an armature 74 made from ferromagnetic material is fixed. The armature 74 is surrounded concentrically by the electromagnet 58. In the energized state, the electromagnet 58 pulls the armature 74 downward and brings the closure element 64 into the closed position from which it can be opened again against the force of the electromagnet 58 by the pressure in the inlet 66. The hollow cylindrical housing 60 there extends within the electromagnet 58 concentrically to the armature 74.

Furthermore, the valve body 60 is equipped, on its end away from the passage 62, with a thread 76 in which engages a thread of the body 78 of an adjustment element 80. The body 78 has a hollow cylindrical construction and is equipped with a handle ring 82 projecting outward on its end facing away from the passage 62. In the interior of the part of the valve body 60 that projects upward past the electromagnet 54 and is enclosed by the lower area of the body 78, there is an intermediate element 84 that is supported so that it can be displaced relative to the valve body 60 in the direction of movement of the tappet 72. Shoulders 86 of the intermediate element 84 and the part of the valve body 60 projecting upward past the electromagnet 54 form an upper limit for the movement range of the intermediate element 84. A coil-shaped spring 88 contacts, with its upper end, the intermediate element 84 and, with its other end, an upper plate 90 of the tappet 72. From above, an adjustment screw 92 that is equipped with a top hexagonal socket (or other engagement element, such as a slot or a Phillips) is screwed into a central thread of the body 78 of the adjustment element 80. This adjustment screw is covered at the top by a cover 94.

With its top side, a housing 96 of the electromagnet 54 forms a stop on which the body 78 of the adjustment element 80 contacts when it is screwed as far as possible onto the thread 76, as shown in FIG. 3. Then a slight gap still remains between the spring 88 and the intermediate element 84, so that the spring 88 does not act on the tappet 72 and the closure element 64. In the situation according to FIG. 3, the opening pressure of the pressure-relief valve 54 is defined solely by the electromagnet 58 that pulls the armature 74 downward by a greater or lesser extent and biases the closure element 64 downward.

The electromagnet 58 can be detached with its body 96 from the valve body 60 after the adjustment element 80 has been unscrewed from the thread 76. This situation is shown in FIG. 4. Because the housing 96 of the electromagnet 58 no longer presents a lower stop for the adjustment element 80, it can be rotated downward on the thread 76 until a shoulder 98 on the inside of the body 78 contacts the upper end of the valve body 60 (in FIG. 3, by means of the part of this valve body projecting upward past the electromagnet 54), as shown in FIG. 4. In this position, the spring 88 is biased to a maximum degree and a highest possible opening pressure of the pressure-relief valve 54 is set. This highest possible opening pressure is set to a desired value by the adjustment screw 92 on the manufacturer side and then the adjustment screw 92 is fixed in the body 78, for example, by adhesive or a coating, and then covered from the outside by the cover 94, in order to discourage unnecessary later adjustment. In FIG. 4, the pressure-relief valve 54 is shown in the opened position, i.e., an inlet 66 pressurized sufficiently for opening.

In the normal operation of the baler, the electronic controller 56 is acted upon with signals with reference to which it specifies the pressure in the piston rod space of the hydraulic cylinder 38 on the electromagnet 58. Input parameters that could be used include, for example, the pick-up rate of the crop that can be detected, e.g., on the drive of the pick-up, or the bale size, or a contact pressure specified by the operator. For this purpose, refer to the disclosure of DE 197 18 229 A1. The electromagnet 58 pulls the armature 74 and the closure element 64 as a function of the size of the electrical current through the electromagnet 58 and/or its pulse width that depend, in turn, on the defaults by the controller 56, more or less in the direction toward the passage 62, while the spring 88 has no influence on the tappet 72 and the closure element 64. As soon as the hydraulic pressure in the passage 62 is greater than the pressure exerted by the armature on the closure element 64, the pressure-relief valve 54 opens. In this way, the pressure on the lines 50, 52 can be changed by the valve 46 that can be displaced, for pressure increase in the line 52, toward the right from the home position shown in FIG. 2 and, for pressure reduction in the line 52, toward the left from the home position shown in FIG. 2. The tension of the pressing means 22 is consequently controlled by the controller 56.

Now, if an error occurred in the electronic controller 56 or a sensor connected to this controller, it would be disadvantageous if the round baler 10 could no longer be used. In this case, the operator could detach the electromagnet 58 from the pressure-relief valve 54, as described above with reference to FIG. 4, and set the opening pressure of the pressure-relief valve 54 by hand, as shown in FIG. 4. In this way, the full adjustment range of the opening pressure up to the maximum opening pressure specified on the manufacturer side by the position of the adjustment screw 92 is provided to the operator. The incorrectly driven electromagnet 58 can no longer affect the opening pressure. After a repair, the situation shown in FIG. 3 can be reestablished.

Having described the preferred embodiment, it will become apparent that various modifications can be made without departing from the scope of the invention as defined in the accompanying claims.

The invention claimed is:
1. A pressure-relief valve comprising:
   a valve body with a passage that can be closed by a moving closure element;
   an electromagnet that interacts with a moving armature that is in driving connection with the closure element; and,
   a spring that interacts with the closure element, a bias tension of the spring being changeable by an adjustment element that can be moved manually relative to the valve body the adjustment element comprising a body and an adjustment screw that is screwed into a thread of the body and defines the bias tension of the spring wherein the adjustment screw can be one of fixed and covered permanently on the body of the adjustment element;
   wherein the electromagnet is mounted detachably on the valve body and,
   the adjustment element and the valve body being constructed such that a manual change of the bias tension of the spring by way of the adjustment element is possible only when the electromagnet is detached from the valve body and when the electromagnet has been removed from the valve body, a maximum, manually adjustable bias tension of the spring can be pre-defined.

2. A pressure-relief valve according to claim 1, wherein the electromagnet forms a stop for the adjustment element.

3. A pressure-relief valve according to claim 1, wherein the adjustment element is provided with a thread that cooperates with a thread of the valve body.

4. A pressure-relief valve according to claim 1, wherein the adjustment element interacts with the spring by way of an intermediate element supported in a displaceable way on the valve body.

5. A pressure-relief valve according to claim 1, wherein the spring is a compression spring biasing the closure element into a closure position blocking the passage.

6. A pressure-relief valve according to claim 1, wherein in an energized state, the electromagnet biases the closure element into a closure position blocking the passage, and, when the electromagnet is mounted on the valve body, the bias tension of the spring corresponds to a minimum value.

7. A round baler with a bale chamber defined by one or more bale forming elements, wherein a tension of the one or more bale forming elements can be defined by means of a hydraulic cylinder whose pressure is determined by a pressure-relief valve comprising:
   a valve body with a passage that can be closed by a moving closure element;
   an electromagnet that interacts with a moving armature that is in driving connection with the closure element; and,
   a spring that interacts with the closure element, a bias tension of the spring being changeable by an adjustment element that can be moved manually relative to the valve body the adjustment element comprising a body and an adjustment screw that is screwed into a thread of the body and defines the bias tension of the spring wherein the adjustment screw can be one of fixed and covered permanently on the body of the adjustment element;
   wherein the electromagnet is mounted detachably on the valve body and,
   the adjustment element and the valve body are constructed such that a manual change of the bias tension of the spring by way of the adjustment element is possible only when the electromagnet is detached from the valve body and wherein when the electromagnet has been removed from the valve body, a maximum, manually adjustable bias tension of the spring can be pre-defined.

8. A round baler according to claim 7, wherein the electromagnet forms a stop for the adjustment element.

9. A round baler according to claim 7, wherein the adjustment element is provided with a thread that cooperates with a thread of the valve body.

10. A round baler according to claim 7, wherein the adjustment element interacts with the spring by way of an intermediate element supported in a displaceable way on the valve body.

11. A round baler according to claim 7, wherein the spring is a compression spring biasing the closure element into a closure position blocking the passage.

12. A round baler according to claim 7, wherein in an energized state, the electromagnet biases the closure element into a closure position blocking the passage, and, when the electromagnet is mounted on the valve body, the bias tension of the spring corresponds to a minimum value.

* * * * *